United States Patent [19]

Anderson et al.

[11] Patent Number: 5,769,999
[45] Date of Patent: Jun. 23, 1998

[54] CAP SEALING MACHINE

[75] Inventors: Ronald C. Anderson; David A. Myers, both of Mt. Pleasant, Pa.

[73] Assignee: Stahls', Inc., St. Clair Shores, Mich.

[21] Appl. No.: 240,095

[22] Filed: May 9, 1994

(Under 37 CFR 1.47)

Related U.S. Application Data

[63] Continuation of Ser. No. 689,024, filed as PCT/US88/04021, Nov. 9, 1988, abandoned.

[51] Int. Cl.⁶ .............................. B32B 31/00; G05G 15/00
[52] U.S. Cl. ......................... 156/359; 156/366; 156/579; 156/581; 156/583.1; 100/319
[58] Field of Search ..................................... 156/358, 359, 156/580, 581, 583.1, 366, 579; 100/93 P, 295, 296, 319

[56] References Cited

U.S. PATENT DOCUMENTS

| | | | |
|---|---|---|---|
| 2,624,389 | 1/1953 | Bungay | 154/1 |
| 2,644,151 | 6/1953 | Krueger | 340/227 |
| 3,035,510 | 5/1962 | Carpenter et al. | 100/93 |
| 3,450,031 | 6/1969 | Peterson . | |
| 3,454,741 | 7/1969 | Stewart . | |
| 3,567,560 | 3/1971 | Stiff | 100/93 P X |
| 3,823,054 | 7/1974 | Balzer et al. | 156/583.1 X |
| 3,878,015 | 4/1975 | Johnston | 156/522 |
| 3,923,590 | 12/1975 | Humphries | 156/580 |
| 3,925,139 | 12/1975 | Simmons . | |
| 3,979,248 | 9/1976 | Kussmaul . | |
| 3,982,418 | 9/1976 | Leavesley et al. | 73/11 |
| 4,055,456 | 10/1977 | Carnegie, Jr. | 156/366 |
| 4,190,485 | 2/1980 | Takeda et al. | 156/583.9 |
| 4,243,470 | 1/1981 | Higashiguchi | 156/583.9 |
| 4,378,266 | 3/1983 | Gerken . | |
| 4,379,018 | 4/1983 | Griesdorn | 156/359 |
| 4,386,993 | 6/1983 | Matsuo . | |
| 4,421,589 | 12/1983 | Armini et al. . | |
| 4,469,545 | 9/1984 | Löw | 156/359 |
| 4,713,047 | 12/1987 | Klinkel . | |
| 5,167,750 | 12/1992 | Myers | 156/583.9 |
| 5,252,171 | 10/1993 | Anderson et al. | 156/358 |

FOREIGN PATENT DOCUMENTS 2170443  8/1986  United Kingdom .

*Primary Examiner*—David A. Simmons
*Assistant Examiner*—Paul M. Rivard
*Attorney, Agent, or Firm*—Brooks & Kushman P.C.

[57] ABSTRACT

An improved apparatus (10) for thermally bonding indicia to caps comprises relatively movable upper and lower platens (12,14) with a heat source in one of the platens for heating it. A handle (18) pivotal in a vertical plane raises and lowers the upper platen (12) swinging it through virtually a 90° arc to permit easy positioning of a cap between the platens where they are open. Both platens (12,14) have curved nesting pressing surfaces (20,20'), the upper platen pressing surface (20) having a concave shape and the lower platen pressing surface (20') having a convex shape with the radius of curvature of the upper platen pressing surface (20) being greater than the radius of curvature of the lower platen pressing surface (20') so that the platens (12,14) apply equal pressure across a cap disposed between them. Apparatus (10) further includes a keypad (40) and digital readout screen on the handle for ready viewing and access by the operator and further includes a microprocessor controller for regulating temperature of the heat source and time of the heat cycle.

11 Claims, 5 Drawing Sheets

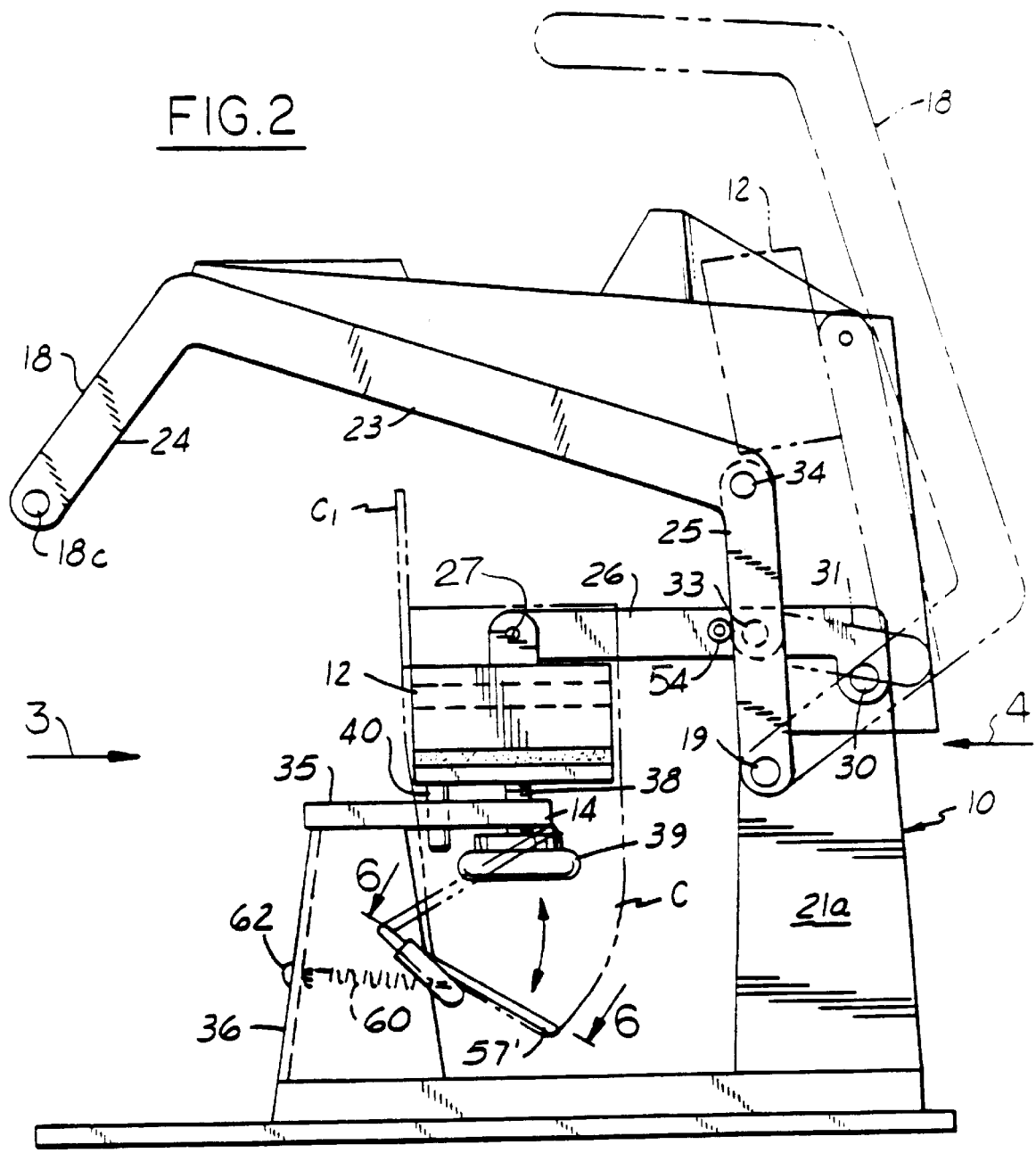
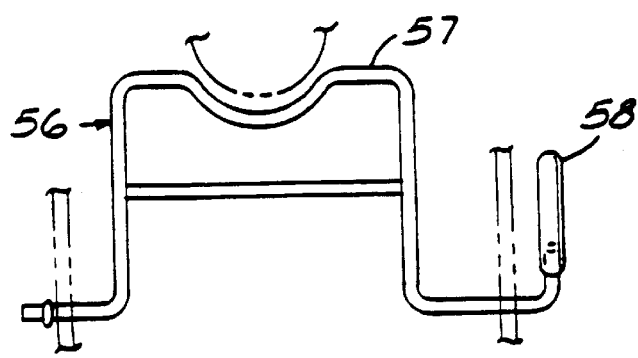

CAP SEALING MACHINE

This is a continuation of application Ser. No. 07/689,024 filed on Sep. 16,1991, now abandoned, based on International Application US88/04021 filed on Nov. 9, 1988 and which is designated the U.S.

TECHNICAL FIELD

This invention relates to an apparatus for thermally bonding indicia to fabric and more particularly to a heat sealing machine of a type used for applying letters and logos to caps.

BACKGROUND ART

Conventional cap heat sealing machines of the clam shell type utilize a heated upper platen movable relative to a lower platen between open and closed positions for heat sealing, i.e., thermally bonding, indicia, having thermally activatable adhesive thereon, to a cap in the closed position of the platens. This thermally bonding indicia; including letters, numbers and identifying logos, is applied to caps by placing the indicia on a crown of the cap between the platens, applying pressure to force the platens toward one another and at the same time applying heat sufficient to cause the thermally bonding indicia to stick to the cap. After an appropriate time interval, the platens are separated and the cap with indicia attached is removed.

Typically, the upper platen is mounted on a vertically swingable handle and manual force applied by an operator to the handle is used to urge the platens together to supply the pressure necessary to accomplish the heat sealing. The design of the prior art machines resulted in inconsistent and uneven pressure being applied to the cap and indicia and often times too little force was applied to effect correct bonding therebetween and a less than optimal bond between the indicia and cap resulted. The force required by the operator in closing and opening the platens in at least one prior art machine would quickly result in tiring the average operator thus rendering repetitive use on several caps a protracted and disagreeable task.

Furthermore, timing of the duration of platen closure is important so that the bonding material melts sufficiently to impregnate the cap so that proper bonding of the indicia is effected. Often, the duration of platen closure is initiated by the operator or by mechanical means set by the operator. Often the timer is a clock or wristwatch although other types of timers have been employed. This method of timing results in inconsistency in length of platen closure and that inconsistency can result in an insufficiently bonded cap and indicia. If the platens are not closed for a long enough period of time that can result in an insufficient bond, and, if the platens are closed for too long, adhesive may bleed through the fabrics and result in ineffective bonding.

DISCLOSURE OF INVENTION

An object of the present invention is to provide an improved apparatus for thermally bonding indicia to caps that is extremely simple to use and requires a minimum of physical effort so that several caps may be done successively without tiring the operator. The apparatus includes a solid state control system that monitors temperature, indicates to an operator when the apparatus is ready for heat sealing, automatically initiates a timing cycle upon platen closure to effect a consistent duration of heat sealing time and alarms the operator to separate the platens after the proper duration of platen closure time has expired.

Another object of the invention is to provide upper and lower platens that are shaped such that the upper platen has a concave pressing surface of a larger radius of curvature than that of the lower platen which has a convex pressing surface so that equal pressure is applied across the cap and indicia by the pressing surfaces of the platens in the closed position.

A still further object of the invention is to provide a physically easily operated machine wherein a linkage is provided enabling the operator to open, close and lock together and thereafter unlock and open the platens with a relatively small exertion. At the same time, the upper platen is swung through substantially a 90° arc between open and closed positions, and the operating handle is swung through a smaller arc. An adjuster is provided for adjusting pressure between the platens in the closed position to assure proper pressure therebetween.

In carrying out the above and other objects of the invention, the improved apparatus constructed in accordance with the present invention comprises a handle pivotal in a vertical plane and to which the upper platen is connected by a linkage that causes the upper platen to move through a greater arc than the handle as the handle is pivoted. The upper platen is movable to a substantially perpendicular position remote from the lower platen to allow maximum working clearance for an operator to load and unload caps on the lower platen.

The lower platen is cantileveredly supported on a lower support arm to allow for loading and unloading of caps in the open position of the platens. The lower support arm includes an adjuster for adjusting the elevation of the lower platen and thereby the pressure between the platens in the closed position. The lower support arm also includes a mechanism for supporting the lower platen for self-alignment with the upper platen in the closed position of the platens.

In the preferred construction, the apparatus includes a cap-hold down mechanism for securing the cap to one of the platens for heat sealing indicia on the cap. The cap holddown mechanism includes a lever and spring with over center locking ability to secure a cap on the lower platen in a locked position. To facilitate operating the controls for timing the sealing cycle and controlling sealing temperature, a keypad and digital read-out are disposed conveniently on the handle for access by the operator.

The above object and other objects, features, advantages of the present invention are readily apparent from the following detailed description of the best mode for carrying out the invention when taken in connection with the accompanying drawings.

BRIEF DESCRIPTION OF THE DRAWINGS

FIG. 2 is a side view of the apparatus with a portion of the controls housing removed for clarity and illustrating the handle and platens in closed and open positions;

FIG. 6 is a sectional view taken along lines 6—6 in FIG. 2;

BEST MODE FOR CARRYING OUT THE INVENTION

Figure 1:
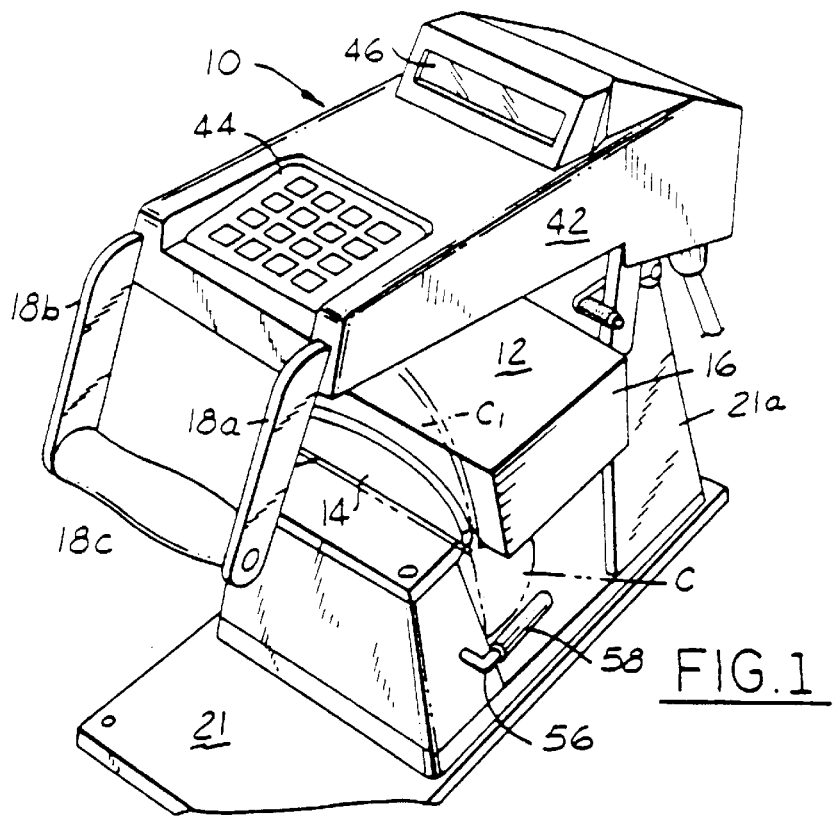
FIG. 1 is a perspective view of an improved apparatus for thermally bonding indicia to caps constructed in accordance with the present invention.

With reference to FIG. 1 of the drawings an improved apparatus for thermally bonding indicia to caps constructed in accordance with the present invention is generally indicated by 10 and is used for thermally bonding indicia such as letters, numerals and logos to caps. As is more fully hereinafter described, the improved apparatus 10 is a manual heat sealing machine that is simple in construction and operations.

Figure 3:
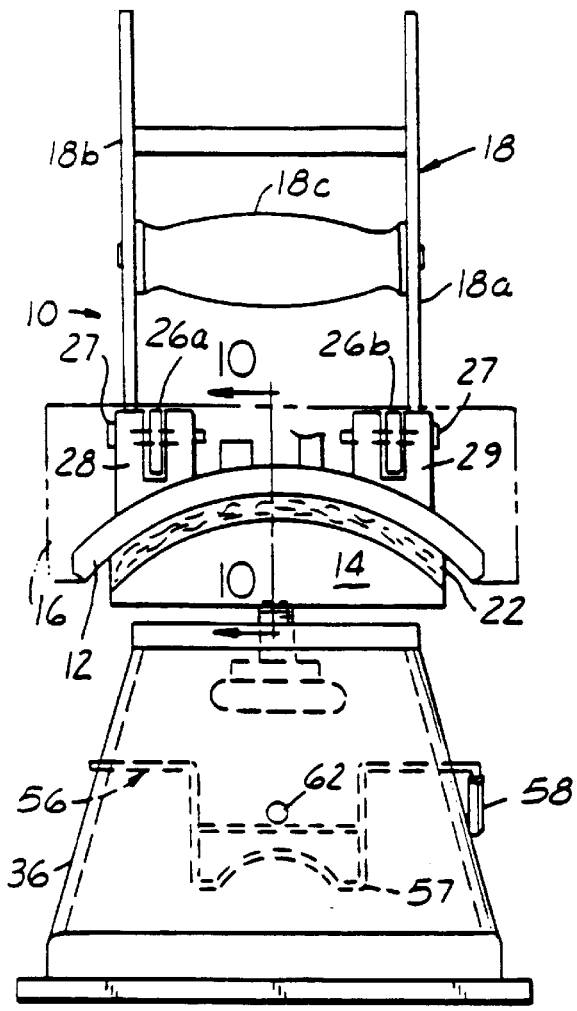
FIG. 3 is a front view of the apparatus.
Figure 9:
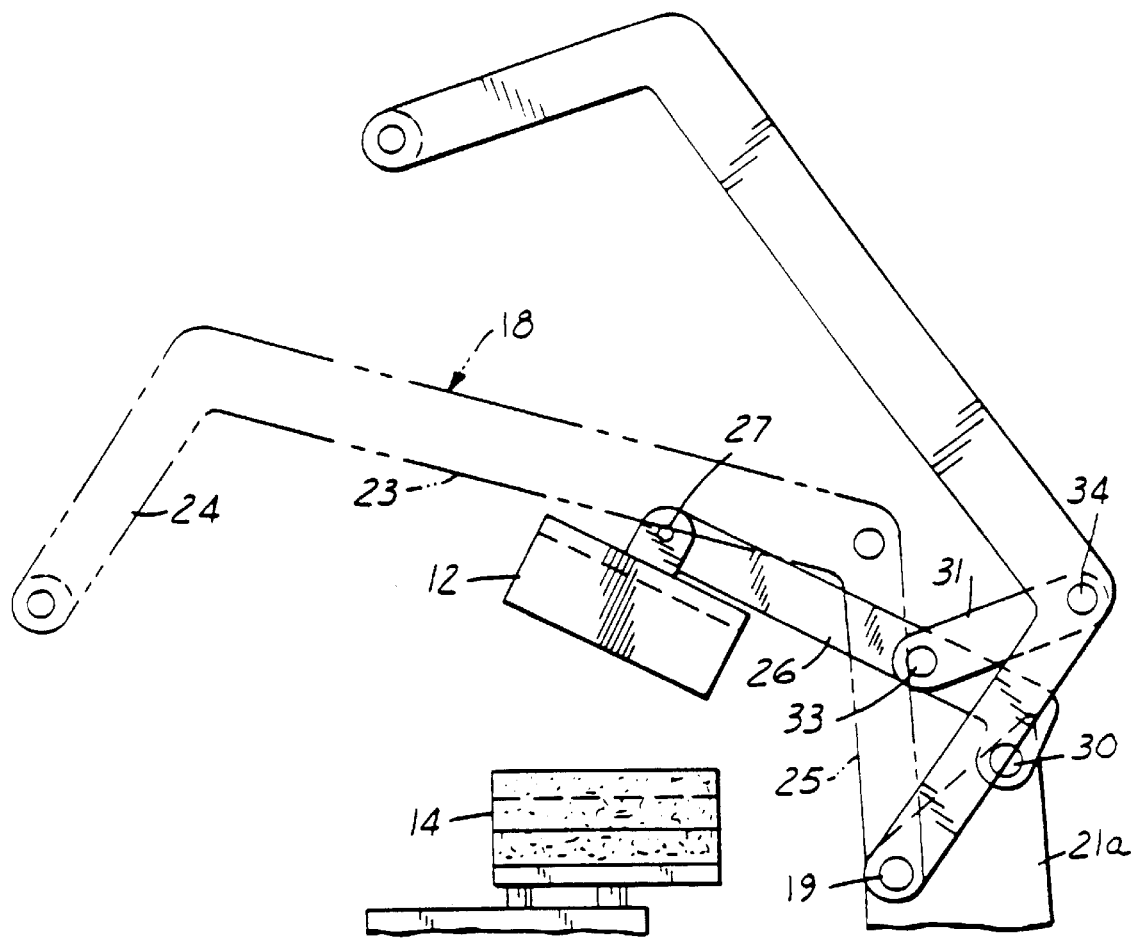
FIG. 9 is a schematic side view of the handle linkage mechanism for the upper platen.
Figure 10:
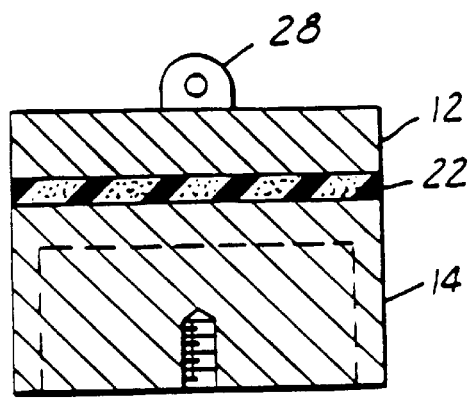
FIG. 10 is a cross-sectional view taken on the line 10—10 of FIG. 3.
Figure 11:
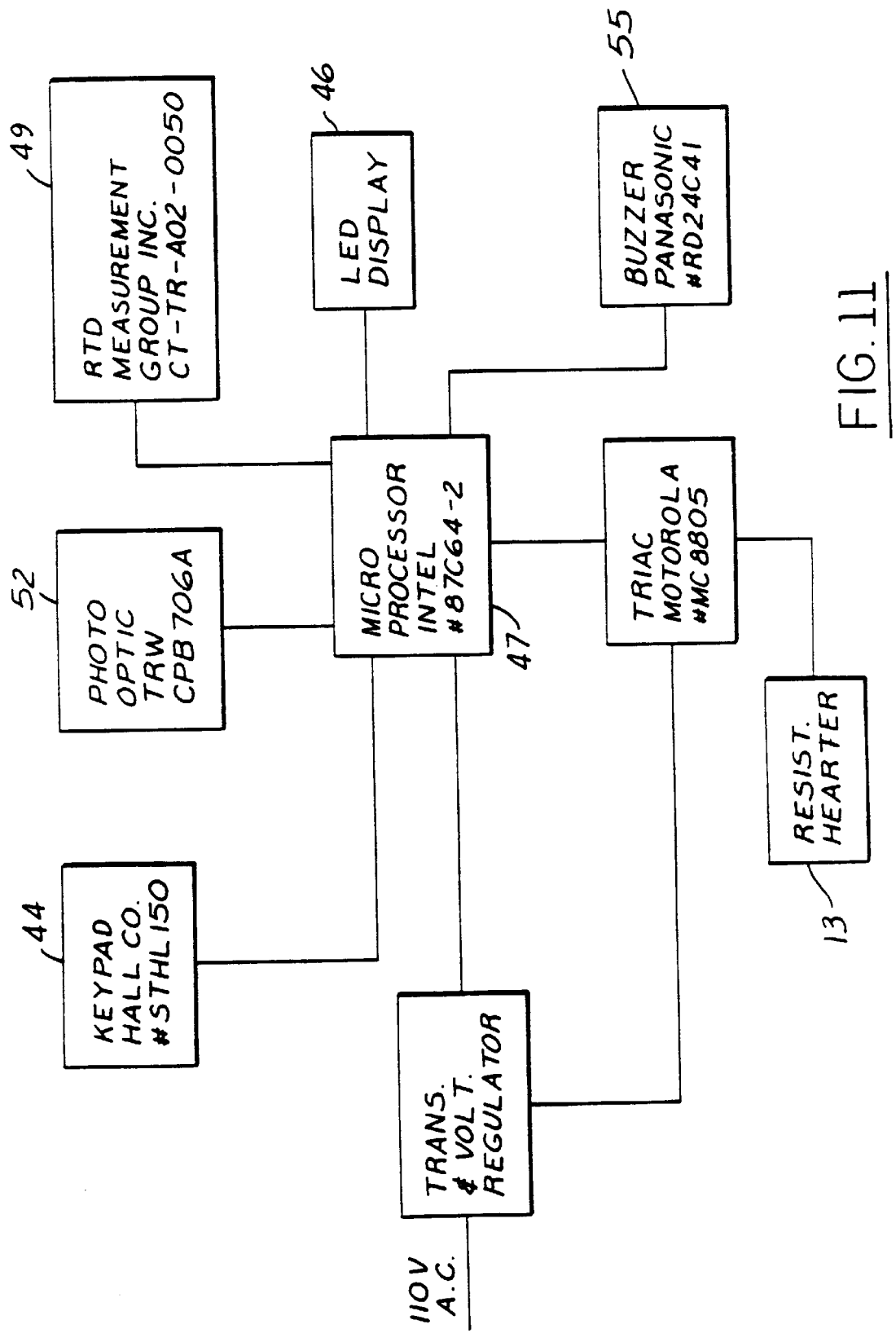
FIG. 11 is a block diagram of the electric control circuit.

As shown in FIGS. 1–3 of the drawings, the improved apparatus 10 has relatively movable upper and lower platens 12,14 movable between an open position shown in phantom in FIG. 2, and a closed position wherein both platens are in relative close proximity. Upper platen 12 includes a heat source in the form of a resistance heater 13 (shown schematically in FIG. 11) for heating the upper platen to provide sufficient temperature for effecting a thermal bond between the indicia and a cap. A handle 18 comprising a pair of laterally spaced apart arms 18a and 18b, and a handle portion 18c extending therebetween and secured thereto, is pivotally mounted as at 19 on the base pedestal 21a extending upwardly from the base 21. The handle 18 is pivotal by the operator from a position in front of the platens as shown in FIGS. 2 and 9, in a vertical plane for raising and lowering the upper platen 12. The handle 18 is also movable relative to the upper platen 12 to provide over-center locking of the upper and lower platens in the closed position of the platens wherein the platens are urged together to provide sufficient pressure to affect the thermal bonding.

Figure 5:
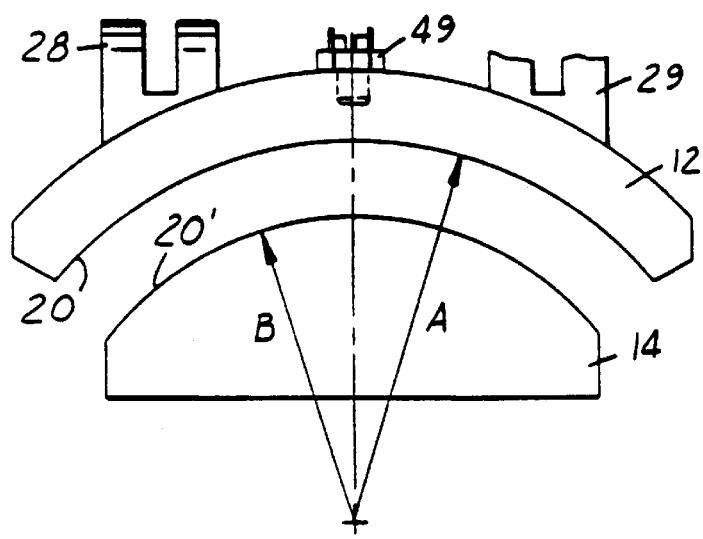
FIG. 5 is a frontal view of the upper and lower platens illustrating their respective radii of curvature.

As shown in FIGS. 3 and 5 of the drawings, the upper and lower platens 12,14 have nesting pressing surfaces 20,20' respectively. As shown in FIG. 5, the upper platen pressing surface 20 has a concave shape and the lower platen pressing surface 20' has a convex shape. The radius of curvature A of the upper platen pressing surface 20 is greater than the radius of curvature B of the lower platen pressing surface 20' so that the platens properly nest in the closed position shown in FIG. 3 and generally thereby equal pressure is applied across the surfaces of a cap disposed between the pressing surfaces of the platens in the closed position. With further reference to FIG. 3, the lower platen 14 includes a compressible heat resistant cover 22 which compensates for irregularities in the cap and indicia so that the irregularities are not pressed into the indicia during the thermal bonding of the indicia to the cap. Preferably the compressible heat resistant cover 22 is a silicone pad although other types of heat resistant covers are contemplated for use with the present invention.

Figure 4:
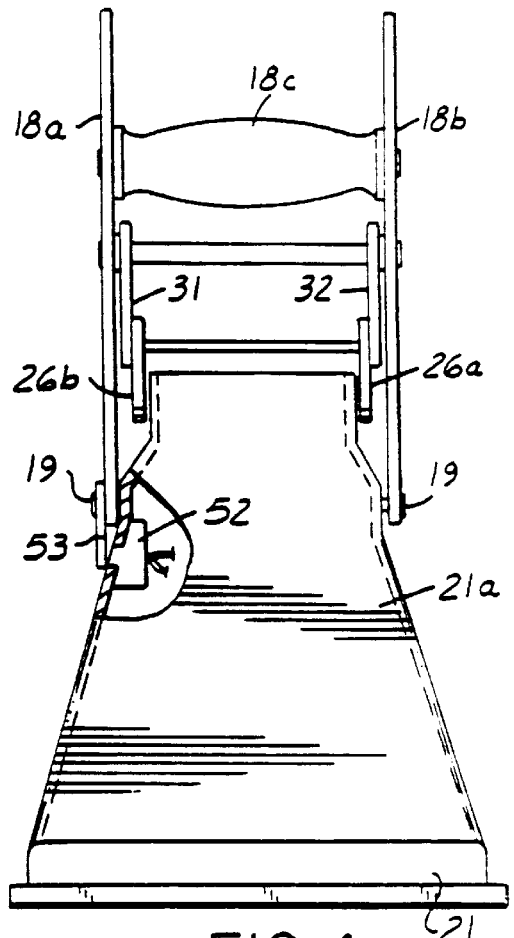
FIG. 4 is a back side view of the apparatus.

With reference to FIGS. 2 and 9, the arms 18a and 18b have a rearwardly extending section 23 terminating at its rearward end in an angularly related downwardly projecting section 25 which is pivotally connected as above-mentioned to the pedestal 21a. Thus, handle 18 swings about pivot 19 substantially as shown in FIG. 2. The platen 14 is carried by lever arm means 26 comprising a pair of laterally spaced lever arms 26a and 26b as shown in FIGS. 2, 3, 4, and 9. The forward ends of arms 26a and 26b are pivotally connected at 27 to the platen between upstanding bifurcated ears 28 and 29. The rearward ends of the arms 26a and 26b are pivotally mounted at 30 to the pedestal 21a. Thus, the upper platen 12 is mounted for vertical swingable movement about the pivot 30 from the solid outline closed position of FIG. 2 juxtaposed on the lower platen 14 to the open position shown in phantom position vertically spaced above and rearward of the lower platen 14. Short links 31 and 32, see FIGS. 2,4, and 9, are connected at pivots 33 and 34 between the handle 18 and the platen carrying lever arm means 26 to swing platen 12 between open and closed positions and to provide an over center locking action. The arrangement of pivots and spacing therebetween is such that upon swinging handle 18 between the closed position shown in solid outline in FIG. 2 and the open position shown in phantom outline, through an angular distances of approximately 55°, the upper platen 12 is swung through approximately 80° between the closed solid outline position and the open phantom outline position. It will be noted in FIG. 2 that in the open position the upper platen 12 is well removed away from the lower platen 14 so that a cap may be easily positioned on the lower platen without interference by the upper platen. FIG. 9 illustrates more clearly than FIG. 2 the linkage and pivot points and operation thereof. The handle 18 and upper platen 12 are shown in solid outline positions intermediate the open and closed positions. The connection of the link means 31 to the operating handle 18 and the upper platen support arm 26 is such as to render the operating handle a second class lever and the support arm a third class lever.

As shown in FIGS. 2 and 4, the lever arm means 26 and links 31 and 32 are disposed between the handle arms 18a and 18b. A stop member 54 mounted on lever arm means 26 is positioned to engage and limit the closing motion of handle 18, stopping the handle when it has just passed the over-center position of pivots 19, 33, and 34. Thus when handle 18 is pulled down until arrested by stop 54, the platens will remain closed exerting pressure on a cap disposed therebetween as schematically depicted at C in FIGS. 1 and 2. The cap brim or visor is illustrated at C1.

In the preferred embodiment, the lower platen 14 is cantileveredly supported on a lower support arm 35 mounted on a hollow pedestal 36 to thereby allow for loading and unloading of caps on the lower platen in the open position of the platens. Lower platen 14 is interchangeable on lower support arm 35 by simply lifting the lower platen off the support arm. This allows use of a variety of lower platens 14 which can thereby accommodate caps having different crown heights.

As shown in FIGS. 2 and 3, the lower support arm 35 includes a pressure adjuster 37 for adjusting the elevation of the lower platen 14 and thereby the pressure between the platens in the closed position. Adjuster 37 is illustrated as a rotatable screw 38 threaded in and extending through the lower support arm 35 and having a handle 39. The upper end of the screw includes an unthreaded length received in a hole in the bottom of the lower platen and bearing against the platen to raise and lower it on adjustment of the screw. The lower platen 14 includes a depending dowel pin 40 loosely received through the lower support arm for self-alignment with the upper platen when the platens are in the closed position. The fit of the unthreaded end of screw 38 in the bottom of the lower platen also allows for a slight amount of play whereby the lower platen virtually floats on the lower support arm 35.

Figure 8:
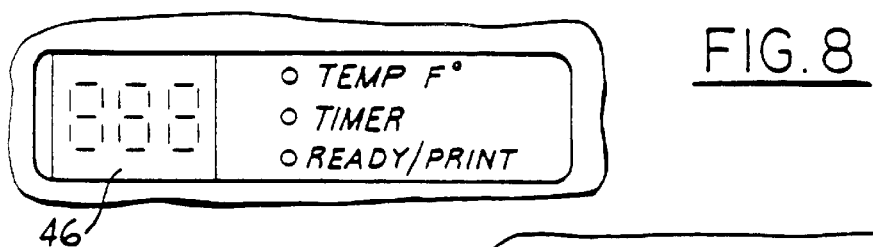
FIG. 8 is a detailed view of a visual display mounted on the handle.
Figure 7:
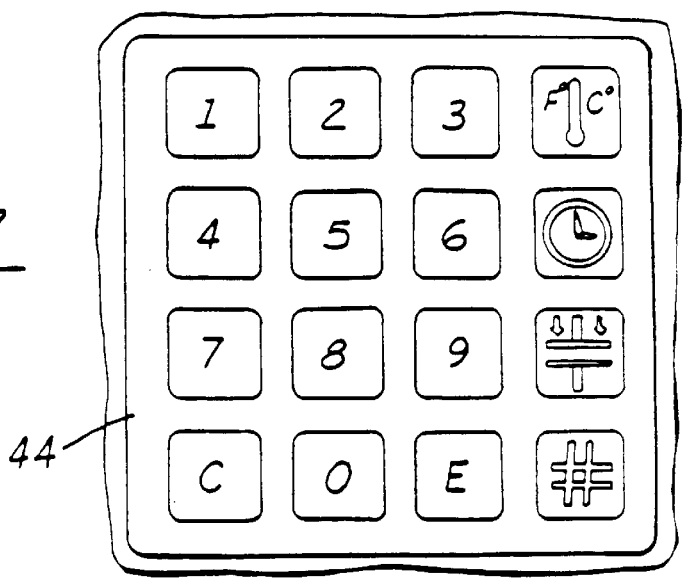
FIG. 7 is a detailed view of a keypad mounted on the handle.

As shown in FIG. 1, the handle 18 is provided with a housing 42 having a keypad 44 and digital readout 46. The electronic components are shown schematically in block diagram in FIG. 11. The keypad is a pressure-sensitive membrane type switch available from The Hall Company of 420 East Water Street, Urbana, Ohio 43078 as Model No. STHL 1501. The digital readout is of the liquid crystal diode type available from several sources. Within the housing there is a micro-processor controller shown at 47 in FIG. 11. A preferred embodiment is available from Intel Corporation of 3065 Bowers Avenue, Santa Clara, Calif. 95051, as Model No. 87C64-2, for regulating temperature of the upper platen and time of the heat cycle. As shown in FIGS. 1 and 8, the digital readout 46 displays temperature and time. Keypad 44 allows the operator to input instructions with respect to upper platen 12 temperature and time. Keypad 44 allows the operator to program the controller for the time and temperature settings desired. The digital readout 46 indicates when the upper platen 12 is sufficiently hot to initiate heat sealing, the duration of platen 12,14 closure after the heat sealing is initiated and causes an alarm to be activated when the heat sealing is completed.

The platen 12 includes a cover 16 within which there is insulation, not shown, to keep the upwardly exposed surface of upper platen at ambient temperature. A platen temperature sensor 49 in the form of a resistance temperature detector (RTD) is available from Measurements Group, Inc. of P.O. Box 27777, Raleigh, N.C. 27611, as Model number CT-TR-A02-0050, and is shown schematically in FIG. 11. The RTD is disposed within the cover 16 and includes a printed circuit printed on platinum or iron alloy which when heated undergoes a material change in the electrical resistance of the temperature sensor. The temperature sensed is relayed as a signal back to the microprocessor controller 47 which acts as a thermostat and through a Triac (available from Motorola Semiconductor Products, Inc., of P.O. Box 20912, Phoenix, Ariz. 85036, as Model No. MC8805) controls energization of the resistance heater 13 in the upper platen 12. The controller is operable to control the temperature in the upper platen 12, within plus or minus 2 degrees Fahrenheit, and also to display that temperature on the digital readout 46 in degrees Fahrenheit.

The controller within housing 42 also includes a timing function responsive to platen 12,14 closure for timing the during of platen closure. An optical switch 52 (see FIGS. 4 and 11) connected to the microprocessor 47 indicates that the platens 12, 14 are closed and initiates a timing sequence. Optical switch 52 is conventionally known as a reflective opto sensor and generates low intensity infrared light. The infrared light is reflected off a small plate 53 attached to handle 18 when the handle is brought down to close the platens 12,14. The same optical switch 52 receives back the reflected light and sends a signal to the microprocessor 47 to indicate that the platens 12,14 are closed and to initiate the timing sequence. A switch such as a TRW reflective opto-sensor Model No. CPB 706A available from TRW Optoelectronics Division, TRW Electronic Components Group of 1215 West Crosby Road, Carrollton, Tex. 75006 is suitable for functioning as optical switch 52 although other switches are contemplated for use in the apparatus 10.

The apparatus 20 also includes an audible alarm 55 (available from Panasonic, Matsushita Electric Corporation of America, One Panasonic Way, Secaucus, N. J. as Model No. RD24C41) shown schematically in FIG. 11, which is disposed within housing 42 for signalling the expiration of time set for platen 12,14 closure. The controller indicates the conclusion of the timing cycle and actuates the audible alarm to notify the operator to open the platens.

Digital readout 46 provides a visual readout of readiness of the heated upper platen 12 for use, temperature of the heated platen, and duration of platen closure. Input information for the digital readout 46 is applied by the controller.

In FIGS. 2, 3, and 6 of the drawings a cap hold-down mechanism or retainer 56 is illustrated. Cap hold-down mechanism 56 is generally U-shaped as shown in FIG. 3 and is housed within the pedestal 36. The bight portion 57 is swung up and down by a handle portion 58 between a cap loading position shown in phantom in FIG. 2 and a cap holding position shown in solid outline. A spring 60 connected between the front of the pedestal at 62 and the bight portion holds the retainer in either the phantom or solid outline positions through its over-center action. In the positions indicated at 57' the bight portion of the retainer engages within the cap at the back and pulls the front of the cap downwardly against the cover 22 on the lower platen preparatory to heat sealing indicia on the cap. The cap hold-down mechanism 56 secures itself in both locked and unlocked positions and is repositionable with the flip of a finger.

While the best mode for carrying out the invention has been described in detail, those familiar with the art to which this invention relates will recognize various alternative designs and embodiments for practicing the invention as defined by the following claims.

What is claimed:

1. In apparatus for thermally bonding heat applied transfer indicia to caps, the apparatus having relatively movable upper and lower platens manually movable between open and closed positions, each platen having a generally complementary pressing surface, the invention characterized by the upper platen pressing surface being of a concave shape and the lower platen pressing surface being of a convex shape with the radius of curvature of the upper platen pressing surface being greater than the radius of curvature of the lower platen pressing surface, whereby equal pressure is applied across the pressing surfaces to a cap and the heat applied transfer indicia disposed between the platen pressing surfaces when the platens are in the closed position, further characterized by a handle pivotal in a vertical plane with linkage connecting the handle to the upper platen and wherein said linkage is constructed and arranged to cause the upper platen to move through a greater arc than the handle as the handle is pivoted while the handle extends downwardly in overhanging relation with respect to the lower platen in the closed position, and in front of the upper platen in both said open and closed positions.

2. The invention defined by claim 1 wherein the upper platen is movable to a generally perpendicular position remote from the lower platen for allowing maximum working clearance for an operator in loading and unloading caps on the lower platen.

3. The invention defined by claim 1 wherein means are provided for supporting the lower platen for self-alignment to the upper platen when the platens are in the closed position.

4. The invention defined by claim 3 wherein said means includes a vertical adjusting screw for raising and lowering the lower platen.

5. In apparatus for thermally bonding heat applied transfer indicia to caps having relatively manually movable upper and lower platens movable between open and closed positions with a heat source in one of the platens and a handle connected to the upper platen for moving it between the open and closed positions, the invention characterized by control means mounted on the handle for ready access and visibility by an operator including a visual readout and keypad for controlling the temperature of the heated platen and setting timing of the duration of platen closure, said handle having a portion extending downwardly in overhanging relation to the lower platen in said lowered position and in front of the upper platen in both the raised and lowered positions.

6. The invention defined by claim 5 further including a temperature sensor and thermostat responsive to the temperature of the heated platen, the sensor being connected to a the controller for controlling the heat source to regulate the heated platen temperature and the sensor also being connected to the readout for displaying the temperature of the heated platen.

7. The invention defined by claim 5 wherein a controller includes a timer responsive to platen closure for timing the duration of platen closure.

8. The invention defined by claim 7 wherein switch means is provided responsive to platen closure for initiating timing of the platen closure duration.

9. The invention defined by claim 5 wherein the visual readout provides a digital readout of readiness of the heated platen for use, temperature of the heated platen and duration of platen closure.

10. In apparatus for thermally bonding heat applied transfer indicia to caps, the apparatus having a base with a lower platen mounted thereon and an upper platen manually movable toward and away from the lower platen with the upper platen being heated, the invention characterized by, an upper platen support arm pivoted on the base for manual swingable movement in a vertical plane;

an operating handle pivoted at one end on the base for manual swingable movement in a vertical plane and having a handle portion at the opposite end; and link means connected between the support arm and operating handle to raise and lower the platen when the handle is swung with the connection of the link means being such as to render the support arm a third class lever and the operating handle a second class lever;

wherein said operating handle has a handle portion extending downwardly in over-hanging relation with respect to the lower platen and in front of the lower platen in said lowered position and in front of the upper platen in both the raised and lowered platen positions.

11. The invention defined by claim 10 characterized in that the connection of the link means with the support arm and operating handle is such that the platen is swung through a greater arc than the arc of movement of the handle to dispose the upper platen in a position removed from the lower platen when in the open position.

* * * * *